3,812,031
SELECTIVE ADSORPTION OF PHENOLS FROM
SOLUTION IN WATER
Frederic C. McCoy, Beacon, and Raymond C. Schlicht,
Fishkill, N.Y., assignors to Texaco Inc., New York,
N.Y.
No Drawing. Continuation-in-part of abandoned application Ser. No. 59,344, July 29, 1970. This application Sept. 20, 1972, Ser. No. 290,686
Int. Cl. B01d 15/06
U.S. Cl. 210—30     11 Claims

ABSTRACT OF THE DISCLOSURE

Extraction of phenolic materials from aqueous solutions by means of polyurethane foam.

CROSS-REFERENCE TO COPENDING APPLICATION

This application is a continuation-in-part of commonly assigned application Ser. No. 59,344 filed uly 29, 1970 and now abandoned.

The present invention has to do with the separation of phenolic materials from aqueous solutions, namely from solution in water.

Phenols and various phenolic materials, unfortunately, find their way as pollutants into the aqueous streams from many industrial operations. In petroleum refining, for example, there are a number of aqueous streams which have been subjected to conditions or have come into contact with other streams which, in turn, have been subjected to conditions which have resulted in the development of usually small but objectionable quantities of phenolic materials.

Thus refinery waste waters may contain an appreciable content of phenolics as, for example, the so-called foul condensates from fluid catalytic cracking processes. Also, coke oven operations characteristically result in aqueous streams containing appreciable concentrations of phenolics.

It is not usually desirable to pass these pollutants into the succeeding process or products and, in any event, it is not desirable to return them to the environment. Furthermore, phenolics are useful chemicals and their recovery is always desirable where this can be accomplished economically.

In accordance with the present invention it has been found that effective separation of phenolic material from aqueous solution can be effected by adsorption upon polyurethane foam.

The adsorption takes place readily and the regenerattion is simple and complete. The polyurethane foam adsorbent is already commercialy available in unlimited quantities at a relatively low cost, in fact, scrap foam is quite suitable for the proposed use. Since it also presents a very high surface contact area, it is relatively cheap to use, as well as readily adaptable to filling columns and other adsorption vessel which are designed to effect the necessary contact. Also, it is quite readily regenerated and may be recycled for successive adsorption and regeneration steps for an indefinite number of times.

It is also relatively selective for the adsorption of phenols to the exclusion of other chemical materials; that is to say, of a number of typical accompanying constituents which have been tested, we do not find any which are comparably adsorbed.

By the term "phenolic material" as used herein is meant hydroxyaromatic compounds such as the benzene-based compounds like phenol, chlorophenols, nitrophenols, aminophenols, the cresols and the xylenols, as well as the naphthalene-based compounds such as the naphthols. It also includes the polyhydroxy materials such as catechol, resorcinol, hydroquinone and 1,2-dihydroxy-naphthalene.

The adsorbent material used in accordance with the present invention, namely the polyurethane foam, includes all of the so-designated products, whether of the flexible type or the relatively rigid type.

It has, however, been found preferable to use the so-called "reticulate" foam, by which term is meant to include such foams as have interstices so interconnected as to form more or less continuous passageways thru the foam. This is to be distinguished from the non-reticulate foams in which the polyurethane has been expanded by a series of internal bubbles which are not necessarily interconnected and which, therefore, do not provide effective internal access by the liquids which are brought into contact therewith.

In order yet further to facilitate surface contact between the aqueous solution and adsorbent, the latter is subdivided or shredded, which may be readily effected by means of a Waring Blender or similar device capable of shredding or chopping the foam. It is preferred, in the case of flexible foam, to conduct the shredding action in the presence of ice so that chunks of foam tend to be kept in more rigid condition by the cooling effect of the chopped ice and water in the blender. Thus the particles of foam are preferably reduced to about 10 mesh in size.

From the chemical standpoint the polyurethane may take either the ester or ether form. To avoid an extensive dissertation on the chemistry of these products reference is made to "Interscience," volume VI, Polyurethane-Chemistry and Technology, Part 1, by Saunders-Frisch, pages 32–48, which is included herein by reference.

As to the adsorbent capacity of the polyurethane, this has been found, under the most favorable conditions, to equal or exceed the weight of the foam itself. This is in contrast to many other adsorbents which are able to adsorb only a small fraction of their weight of phenolic material. Considering the relatively higher costs of many of the other well-known polymeric adsorbents, this results in a substantial economic advantage for polyurethane foam.

As previously intimated, regeneration of the adsorbent is greatly facilitated by the fact that it may be conducted with various low boiling solvents, as, for example, acetone or methyl alcohol. Since acetone in particular is a solvent for many polymeric materials in conventional use, it is quite surprising that it can be used to regenerate polyurethane, which does not seem to be degraded by repeated regeneration, even after an indefinite number of adsorption and regeneration cycles. Therefore, the present adsorbent is not only cheaper to use but is simpler to regenerate than the ion exchange resin which have been proposed for this purpose.

The effect of temperature upon the present process of absorption, within reasonable ambient ranges, is essentially a straight line function.

In commonly assigned U.S. Pat. No. 3,617,531 issued Nov. 2, 1971 wherein a similar adsorption process involves the separation of phenolic materials from hydrocarbon fluids, the temperature effect is also a straight line function in which adsorption, however, is favored considerably by lower temperatures in the range of 10–20° C.

The present invention, over comparable temperature ranges, exhibits adsorbent properties which do not vary as widely with temperature, that is to say, the adsorbent properties do not improve comparably with reduction in temperature.

In general, therefore, such operations are normally conducted at temperatures in the range of, for example, 10–70° C. and preferably around ordinary room temperatures in the range of 20–40° C. or preferably 25–30° C.

By way of yet further distinguishing over the invention described and claimed in our aforementioned copending patent application the present invention contemplates effecting surface contact between the polyurethane and the aqueous solution of phenolic material in the presence of hydrophilic fibres. This follows from the fact that many polyurethane foams are relatively hydrophobic, which can interfere with the interfacial contact which is necessary to permit efficient adsorption. While the effect may not be quite as objectionable where the finally divided adsorbent material is immersed in the solution and agitated therewith or permitted to remain for long periods of time, it may be of great importance in the more typical procedures of contacting, wherein, for example, the phenolic solution is brought in contact with the adsorbent in a packed tower or column and is permitted to trickle downwardly therethrough.

In such instances substantial intermixtures of the finely divided polyurethane foam with hydrophilic fibres of cellulose, ethoxylated cellulose, asbestos and glass, for example, are mandatory.

Cellulose fibres, as is well known, may be rendered more hydrophilic by ethoxylation by, for example, ethylene oxide. Colloquially, the cellulose fibres are partially provided with outwardly extended hydroxy groups. Since complete ethoxylation would render the cellulose water-soluble and therefore useless as a fibre, it is essential to restrict ethoxylation well short of this point. A product made by Hercules, Inc. and identified as HXV–20X is suitable for this use.

The fibres, as indicated, are intimately mixed with the chopped or shredded particles of polyurethane in substantial proportions; for example, a 50–50 mix is satisfactory. A preferred weight ratio of polyurethane to hydrophilic fibre is 2:1 with a broad range of from about 1:5 to about 100:1.

As a result, the percolating aqueous solution of phenolic material appears to follow the hydrophilic fibres into close and intimate contact with the polyurethane surfaces and to facilitate wetting thereof. The hydrophilic fibres above mentioned have no appreciable absorptive affinity for phenolic materials and therefore the results realized are obviously due to the polyurethane component.

It is apparent that polyurethane foam is also effective in adsorbing substituted phenols from water. The hydrophilic fibres not only perform an important function in facilitating the step of adsorption but this appears to be true regardless of the extent to which the polyurethane exhibits hydrophobic properties. Even those foams which are relatively low in hydrophobic characteristics are found to be substantially improved with the presence of the fibrous material. While we do not wish to be bound thereby, it is theorized that this is due to the fact that the presence of the fibres overcomes the tendency for the less hydrophobic polyurethane foams to swell and thus become less permeable in the presence of moisture.

It may at this time be emphasized that the preferred ratio of polyurethane to hydrophilic fibre is about 2:1 by weight with a broader general range of 1:5 to 10:1.

The present invention has the further advantage of enabling adsorption to be conducted in a series of successive stages so that the initial stage of adsorbent as it becomes saturated can be withdrawn and regenerated and inserted at the discharge end of the series so that the process, in effect, becomes continuous.

In order to exemplify the present invention, a standard test was first set up under a procedure which involved weighing out a 3 gram sample of the adsorbent material to be tested for adsorbency, into a 250 ml. erlenmeyer flask and adding thereto 75 ml. of approximately 0.01% m-cresol solution in water by weight. The mixture was shaken thoroughly and permitted to remain in contact at room temperature. The resulting supernatant liquid was then decanted and analyzed for residual phenolic material.

The following table lists the results of this test on polyurethane foams of both the ether and ester types as well as on activated vegetable carbon, polystyrene foam and other polymeric materials:

| Adsorbent: | Filtrate analysis phenol content, p.p.m. |
|---|---|
| None | 103 |
| Polyurethane foam—ether type (10 mesh) | 1 |
| Polyurethane foam—ester type (10 mesh) | 11 |
| Activated vegetable carbon (30 mesh) | 5 |
| Polypropylene fiber (3 denier-¼″ long fibers) | 102 |
| Polyvinyl chloride (approx. 30 mesh) | 99 |
| Polystyrene foam (approx. 20 mesh) | 104 |

Comparison with polystyrene shows that it is the unique affinity of the polyurethane foam rather than its foam structure which is responsible for the success of the present process.

Especially to be noted is the effectiveness of the present invention at low concentrations of phenolic materials.

In order to exemplify the present invention in a more typical situation where the phenolic material is recovered from solution by passing it thru masses or columns of adsorbent, a standard test was developed wherein the column was packed with adsorbent and subjected to a downflow of a solution of phenolic material. More specifically, the column was a glass tube having an inside diameter as hereinafter specified and a length of about 50 cm. A specified charge of adsorbent was loaded into the column, appropriately associated as previously indicated, with a hydrophilic fibrous material. The test solution involving various proportions of phenol or meta cresol in aqueous solution was supplied to the upper end of the column at a rate of 5–10 ml. per min., at room temperature and samples were taken at the bottom of the column and analyzed for phenol or cresol content.

The significant feature of these tests is the occurrence of the so-called "break through," namely the point at which substantial phenolic material appears in the samples. Specifically the results are recorded as the quantity of aqueous liquid taken at the bottom of the column before "break through" occurs.

In other words, the solution passing thru the column is, at first, recovered regularly as, for all intents and purposes, water substantially free of phenolic material. In such case there ultimately results a condition where the adsorbent material becomes saturated to the point where a more or less rapid increase in phenolic material occurs in the collected samples. This is the "break through" and is expressed as the volume, in milliliters of water, collected at the breakthrough point. This gives a comparative indication of the prospective properties of the adsorbent from the standpoint of the relative quantity of solution that it is capable of clearing up and purifying.

Also shown is the weight of phenolic material in the volume of charge solution equal to the volume of effluent at breakthrough. This weight, divided by the weight of adsorbent, provides a measure of the adsorbing capacity of one gram of adsorbent. Comparative results of some of these tests are as follows:

stantial portion at least of the phenolic material contained in the water.

PERCOLATION OF AQUEOUS SOLUTIONS OF PHENOLIC MATERIAL COLUMN PACKING

| Column dimensions, cm. | | Absorbent | Fibre | Solution | Break thru, cc. | Phenolics adsorbed, g. | Phenolic/polyurethane, g. |
|---|---|---|---|---|---|---|---|
| Diameter | Length | | | | | | |
| 2 | 50 | ............ | 12 g. ethoxylated cellulose | 0.01% cresol | <100 | <0.01 | <0.0008 |
| 2 | 50 | 12 g. polyurethane | 6 g. ethoxylated cellulose | do | 1,200 | .12 | 0.01 |
| 2 | 50 | do | 12 g. glass fibre | do | 700 | .07 | 0.006 |
| 2 | 50 | do | 12 g. asbestos fibre | do | 700 | .07 | 0.006 |
| 2 | 50 | do | 6 g. ethoxylated cellulose | 0.5% phenol | 500 | 2.5 | 0.20 |
| 2 | 50 | 18 g. nuchar veg. carbon | | do | 600 | 3.0 | 0.17 |
| 2 | 50 | 12 g. polyurethane | 6 g. ethoxylated cellulose | 1.0% phenol | 350 | 3.5 | 0.3 |
| 5 | 50 | 60 g. polyurethane | 30 g. ethoxylated cellulose | 3.0% phenol | 1,200 | 36 | 0.6 |
| 5 | 50 | do | do | 7.0% phenol | 1,000 | 70 | 1.17 |
| 2 | 50 | 18 g. nuchar veg. carbon | | 3.0% phenol | 100 | 3 | 0.17 |

One significant feature of the foregoing example is that while the polyurethane foam had an adsorbency comparable with activated carbon at a phenol-in-water concentration of 0.5%, at a phenol concentration of 3.0% it was four times more effective than the activated carbon. It is unexpected and surprising that the capacity of polyurethane foam for phenol adsorption increases substantially as the phenol concentration in the charge solution increases. For example, at a phenol-in-water concentration of 7.0%, adsorption of phenol per gram of polyurethane was twice the value of 3% phenol concentration.

The following is also a series of examples conducted with various substituted phenols according to the first mentioned batch test and using in each case 25 ml. of 1% solution of the phenolic material in water together with one gram of 10 mesh polyurethane foam.

Phenolic material: Reduction in adsorbed phenolic material, percent
p-Nitrophenol _____ 87
p-Chlorophenol _____ 87
p-Aminophenol _____ 23

Typical examples of regeneration of the adsorbent are as follows. The typical column in the foregoing table describing the examples of percolation is flushed with 250 ml. portions of acetone, using a vacuum to draw the solvent thru the column and to air dry the column until it reaches its original weight.

The phenolic material, admixed with some water, may be recovered by distilling off the acetone from the column washings.

It is to be noted that regeneration may also be accomplished by other suitable phenolic solvents such as methanol, hydrocarbons, hot water, etc.

We claim:
1. In the purification and recovery of phenolic material from an aqueous solution, the steps which comprise contacting a solution of the phenolic material in water with a polyurethane foam in the presence of hydrophilic fibers at a temperature in the range of about 35 to 200° F. for a substantial time and separating the resulting liquid from the foam after removal and adsorption thereby of a substantial portion at least of the phenolic material contained in the water.

2. The process according to claim 1 wherein the polyurethane is regenerated by passing a low boiling phenolic solvent therethrough.

3. The process as defined in claim 1 conducted at about room temperature.

4. The process as defined in claim 1 wherein said contact is effected by passing the water solution of phenol thru a column containing the polyurethane foam, intimately associated with a substantial proportion of hydrophilic fibres.

5. The process as defined in claim 4 conducted at a temperature in the range of 35 to 200° F.

6. The process as defined in claim 4 conducted at about room temperature.

7. The process according to claim 4 wherein the polyurethane foam is of the ester type.

8. The process according to claim 4 wherein the polyurethane foam is of the ether type.

9. The process according to claim 4 wherein the polyurethane foam is a reticulated foam.

10. The process according to claim 4 wherein the weight ratio of polyurethane to hydrophilic fibres ranges from about 1:5 to about 100:1.

11. The process according to claim 4 wherein the weight ratio of polyurethane to hydrophilic fibre is about 2:1.

References Cited
UNITED STATES PATENTS
3,617,531    11/1971    Schlicht et al. _____ 208—263

OTHER REFERENCES

Molecular Adsorption of Phenols on High Polymers of Different Degree of Polymerization and Crosslinking, F. Wolff & G. Diederichs, Plaste Kautschuk 11(8), 462–6 (1964), ch. abs. 64:8330d.

SAMIH N. ZAHARNA, Primary Examiner

B. CASTEL, Assistant Examiner

U.S. Cl. X.R.
210—40, 505

PO-1050
(5/69)

UNITED STATES PATENT OFFICE
CERTIFICATE OF CORRECTION

Patent No. 3,812,031                     Dated May 21, 1974

Inventor(s) FREDERIC C. McCOY AND RAYMOND C. SCHLICHT

It is certified that error appears in the above-identified patent and that said Letters Patent are hereby corrected as shown below:

| | |
|---|---|
| Column 1, line 22 | "uly" should read --July-- |
| Column 2, line 57 | "resin" should read --resins-- |
| Column 3, line 48 | "100:1" should read --10:1-- |
| Column 6, Claim 10 line 39 | "100:1" should read --10:1-- |

Signed and sealed this 1st day of October 1974.

(SEAL)
Attest:

McCOY M. GIBSON JR.
Attesting Officer

C. MARSHALL DANN
Commissioner of Patents